United States Patent [19]

Roth

[11] Patent Number: 5,131,045
[45] Date of Patent: Jul. 14, 1992

[54] AUDIO-AUGMENTED DATA KEYING

[76] Inventor: Richard G. Roth, 8 Sutton Ct., Great Neck, N.Y. 11021-1318

[21] Appl. No.: 521,537

[22] Filed: May 10, 1990

[51] Int. Cl.⁵ .......................... G10L 5/05; H04M 18/56
[52] U.S. Cl. ........................................ 381/43; 381/51; 379/88
[58] Field of Search ....................... 381/41–45, 381/48, 51–53; 379/88, 97, 52, 354, 355; 395/2

[56] References Cited

U.S. PATENT DOCUMENTS

| | | | |
|---|---|---|---|
| 4,418,412 | 11/1983 | Kariya ...................................... | 381/43 |
| 4,598,367 | 7/1986 | DeFrancesco et al. ............... | 381/51 |
| 4,782,509 | 11/1988 | Shepard .................................. | 379/88 |
| 4,942,616 | 7/1990 | Linstroth et al. ...................... | 381/51 |
| 4,945,557 | 7/1990 | Kaneuchi et al. ...................... | 379/88 |

*Primary Examiner*—Dale M. Shaw
*Assistant Examiner*—Michelle Doerrler
*Attorney, Agent, or Firm*—Brumbaugh, Graves, Donohue & Raymond

[57] ABSTRACT

Present-day limitations of the conventional touch-tone keypad are overcome permitting alphabetic information to be entered into a distant computer. The caller speaks a speech portion into a telephone handset, and then types out the speech portion on the touch-tone keypad. The computer receiving the call converts the spoken voice information into a form suitable for additional digital processing, as by extracting speech-recognition features from the spoken information. The computer processes the typed numeric string into a list of all the possible combinations of characters it could represent. The extent of correlation between the features of the spoken speech portion and each of the combinations is determined, and the combination having the highest correlation is taken to be the speech portion entered by the user.

20 Claims, 1 Drawing Sheet

AUDIO-AUGMENTED DATA KEYING

BACKGROUND OF THE INVENTION

It is not easy to enter alphanumeric data into a distant computer by telephone. This invention relates generally to a new way of entering alphanumeric data over a communications channel where the terminal equipment has far fewer keys than the number of distinct alphanumeric characters to be conveyed, and relates specifically to a new way of entering character data with no more keys than are found on a touch-tone keypad.

Where alphanumeric data are to be communicated over a telephone line, a traditional approach is to convert the alphanumeric data into a serial binary data stream, and to use the stream to modulate an audio signal which is demodulated at the receiving end. If the data communication is to be two-way, each end of the line must be equipped with a modem (modulator-demodulator). Modems today represent the most commonly used method of character communication over telephone lines. Typically at one end of the line is a human user, and at the other end is a computer.

While modem communications can be very fast and reliable, there is the severe drawback that it requires the human user to have a modem and a terminal or computer. While each telephone instrument represents a potential point of communication, the installed base of such equipped users is far smaller than the number of telephone instruments.

A number of investigators have attempted to exploit the highly standardized touch-tone keypad as a means of entry of information to computers. Where the information to be entered is numerical or composed of prearranged yes/no answers, considerable use has been made of touch-tone keypads. It is well known, for example, for a bank to set up a system permitting account holders to obtain account balances by entering the account number after calling a specially programmed bank computer on the telephone.

Matters become much more difficult if the data to be entered is composed of arbitrary letters of the alphabet, since there are only twelve keys on a touch-tone keypad, and twenty-six possible letters. The well-known mapping of letters to numbers (ABC to the digit 2, DEF to the digit 3, and so on) permits one way for a user to enter letters. But the three-to-one grouping leaves substantial ambiguity when the digits are received. If the received digits are 2, 2, and 8, the letters entered may have been the word BAT or the word CAT, for example. It is well known that Q and Z do not appear on most keypads. Some systems using a keypad for letter input will assign Q and Z to the "1" or "0" digits. Other systems assign Q to the "7" key (along with P, R, and S) and Z to the "9" key (along with W, X, and Y).

One known method for entering alphabetic information via a touch-tone keypad is to use left, right, and center keys, being three additional keys beyond the existing numeric keys, to modify the numeric keys. Left-2, meaning the left key followed by the 2 key, would represent the leftmost of the letters on the 2 key, namely the letter A. Right-2 would represent the letter C, and so on. This has the obvious drawback of requiring twice as many keystrokes as there are letters in the word.

Another approach for communicating characters by a touch-tone keypad is for the user to simply "spell" a desired word character by character until the point that enough digits have been entered that the word is known with certainty. For example, some voice-mail systems allow a caller to enter the name of a desired recipient letter by letter until the recipient is unambiguously determined. This approach is workable, however, only if the universe of possible matches is quite small.

Investigators have also attempted to provide alphabetic information via conventional telephones through speech recognition. A computer receives a speech signal (presumably a word) and attempts to determine which word was spoken. If the recognition was successful, the identified word may be thought of as alphabetic information entered over the telephone line. Speech recognition is fraught with problems, however, since present-day technology does a poor job of getting the right answers. If there is an artificially constrained universe of possible words, the success rate of a speech recognition system can be quite high, but the user may be frustrated with the small permitted vocabulary. Another way to improve the success rate is to demand only that the system manage to recognize the words spoken by a single speaker; this has the drawback that the system cannot accommodate speakers other than the prearranged single speaker.

There is a great need, then, for a simple, reliable way to enter alphabetic information via a telephone line, without the need for a modem or other equipment in addition to the conventional telephone instrument, and without the poor success rate of speech recognition.

SUMMARY OF THE INVENTION

According to the invention, present-day limitations of the conventional touch-tone keypad are overcome permitting alphabetic information to be entered into a distant computer. The caller speaks a word into a telephone handset, and then types out the word on the touch-tone keypad. The computer receiving the call converts the spoken voice information into a form suitable for additional digital processing, as by extracting speech-recognition features from the spoken information. The computer processes the typed numeric string into a list of all the possible combinations of characters it could represent. The extent of correlation between the features of the spoken word and each of the combinations is determined, and the combination having the highest correlation is taken to be the word entered by the user.

In an exemplary embodiment of the invention, the word having highest correlation is synthesized and played back to the caller, or is spelled out letter by letter to the caller, who indicates by a single keystroke whether the word identified matches the word the user had in mind. If the system has gotten the word wrong, the user is given an opportunity to correct the entry, either by speaking the word again, or perhaps by spelling the word by speaking its spelling, letter by letter.

Preferably one of the tests performed is to ensure that the word having the highest correlation has a correlation exceeding that of the second-closest word by at least some predetermined margin.

BRIEF DESCRIPTION OF THE FIGURES

The invention will be described with reference to two figures, of which

DETAILED DESCRIPTION

Figure 1:
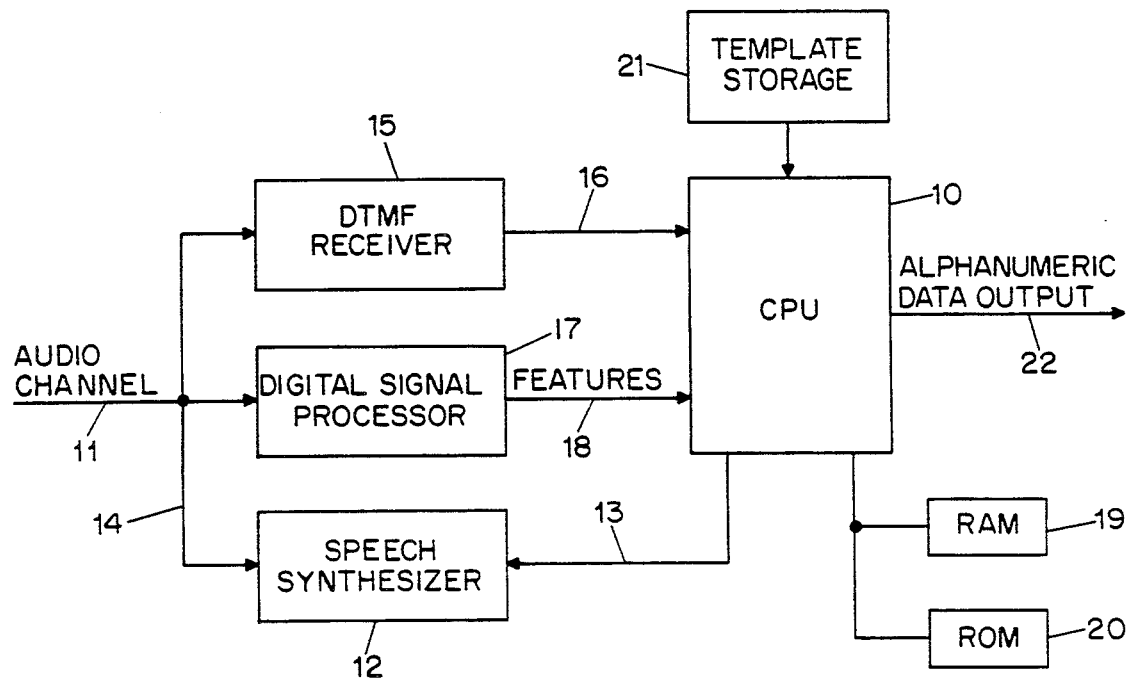
FIG. 1 shows in functional block diagram an embodiment invention.

The invention will be described in detail with respect to an exemplary embodiment. Turning first to FIG. 1, a central processing unit (CPU) 10 is shown which interfaces with other portions of an audio-augmented data keying apparatus. An audio channel 11, typically a telephone line interface, forms one end of a telephone connection through the public switched network. At the other end of the telephone connection is a human user using a conventional touch-tone telephone, not shown in FIG. 1.

The CPU 10 prompts the user for input through audio prompts generated under CPU control by a speech synthesizer 12. CPU control channel 13, generally an I/O port in the I/O address space of CPU 10, permits commands from CPU 10 to reach synthesizer 12. Audio path 14 permits the output of synthesizer 12 (which includes the above-mentioned prompts) to reach audio channel 11 to be heard by the user.

If the user presses one of the touch-tone keys, the generated audio tone, which is a dual-tone multifrequency (DTMF) tone, is received by DTMF receiver 15. Receiver 15 decodes the tone and derives the numeric digit or symbol (e.g. * or #) associated with the tone. The digit or symbol is conveyed typically by a four-bit code to CPU 10 via channel 16, generally an input port in the I/O space of CPU 10.

Spoken words from the user may be received by digital signal processor 17, and features extracted from the received audio signals are made available to CPU 10 by data channel 18, preferably an I/O port in the I/O space of CPU 10.

CPU 10 has access, by means of its address/data bus, to RAM 19 and ROM 20, and preferably to other peripheral devices, not shown in FIG. 1, such as disk drives, printer, and the like. CPU 10 has access to template store 21, discussed further below, and provides alphanumeric data (derived from user inputs according to the embodiment) to other equipment, not shown in FIG. 1, by output channel 22.

Audio-augmented data keying according to the embodiment is performed as follows. The user responds to prompts by pressing keys of the touch-tone keypad of the user's telephone so as to spell a word. The tones are received by receiver 15, and the derived digits (or symbols) are made available to the CPU 10. CPU 10 uses the information about digits received to select candidate words from template store 21. For example, if the digits received are 2, 2, and 8, what is known is that the word is three letters long, that the first letter is A, B, or C, that the second letter is A, B, or C (but not necessarily the same as the first letter), and that the third letter is T, U, or V.

As a first approximation, the candidate words are:
AAT, AAU, AAV, ABT, ABU, ABV, ACT, ACU, ACV, BAT, BAU, BAV, BBT, BBU, BBV, BCT, BCU, BCV, CAT, CAU, CAV, CBT, CBU, CBV, CCT, CCU, and CCV.

The number of candidates is 3 to the third power, or 27. Of course, if the language spoken by the user is English, some of the candidates (e.g. ABV, BCT, and CCV) are unpronounceable and do not appear in any common dictionary as words. A template store 21 contains all the words to be potentially recognized, which may range from a few hundred to as many as a hundred thousand. Each of the candidate words (of which there are twenty-seven in this case) is looked up in the template store 21, and if there is no match with an entry in the template store then the combination is discarded from further analysis. In the example being considered here, a typical template store would likely have entries only for BAT and CAT.

It should be understood that the invention may also be employed to permit recognition where a received DTMF digit is mapped not only to three letters of the alphabet but more broadly, namely to the digit itself as well as the three letters. If so, the number of candidates is, in the above example, 4 to the third power. For clarity the embodiment is discussed in the context of mapping one digit to three letters, but the scope of the invention covers either mapping.

It is known in the speech-recognition field to accomplish the recognition of speech by extracting so-called "features", indicative typically of the intensity of sound energy in each of a number of preselected frequency bands, indicative of the overall sound intensity, and so on. To recognize a word, it is well known to compare the features of a spoken word with a number of "templates", each indicative of the features associated with that word when spoken. The template having the closest match with the received features is taken to indicate the word spoken.

In known speech recognition systems one of the most vexing problems is figuring out when one spoken word ends and the next begins, but in the apparatus of the embodiment it is assumed that the user speaks only one word at a time, in response to synthesized prompts.

One skilled in the art will appreciate that while the invention is disclosed in an embodiment calling for the user to speak one word at a time, the invention could also be programmed to work with the user speaking entire phrases. The apparatus would then attempt to match the received speech information with a template for the phrase. The keypad entry could convey the letters in uninterrupted sequence, or a particular key (e.g. * or #) could be arbitrarily assigned to represent a space between words. In the discussion below, the term "word" is intended broadly to mean not only the term as it is conventionally used, but also, where context permits, to mean phrases as well. The term "speech portion" may also be used as a term generally embracing either phrases or individual words.

In the apparatus of the embodiment, the template store entries include not only the spelling of a word but also speech-recognition features for the word. In this case, features associated with the words BAT and CAT are retrieved for later comparison with what the user speaks, as will now be described. In an embodiment handling not only single words but also phrases keyed by the user with an indication (such as the above-mentioned # key) of spaces between words, template store entries would be retrieved for the individual words entered and would be pieced together into "phrase templates" for comparison with the spoken phrase as described below. In an embodiment handling not only single words but also phrases keyed by the user with no indication of spaces between words, template store entries would be retrieved for the entire sequence that was entered, and would be compared with the spoken phrase as described below.

Once the apparatus has received the touch-tone digits and culled feature information from the template store for each possible match, a synthesized prompt is generated by CPU 10 to prompt the user to speak the word. The received speech goes to signal processor 17 and the extracted features are compared with the possible matches. Preferably the degree of correlation found in the comparison is expressed numerically and stored.

If all goes well, one of the candidates will correlate much more highly than any of the others. It will be appreciated that some prior art speech recognition systems try to match the received features with every entry in the template store. In the case where the template store is large, with perhaps many tens of thousands of entries, this requires many tens of thousands of comparisons and is fraught with the danger of an incorrect result since several entries may turn out to have correlation coefficients not far below that of the entry with the highest correlation coefficient. In the case where the template store is small, on the other hand, the prospect of having one entry correlate much better than the others is greater but the obvious drawback is the limited recognition vocabulary.

Thus one advantage of the invention may be seen—where the touch-tone entry is taken into account the portion of the template store that must be compared with the received features is reduced substantially. This saves computational time and enhances the prospect of correct word recognition on the first try.

In many cases a word of a particular spelling admits of two or more pronunciations. Such words, called allophones, do not cause a problem for the apparatus of the invention. Feature templates for each of the pronunciations are stored in the template store; the number of feature templates to be compared with the received features may thus exceed the number of words in the template store that match the touch-tone key information. Similarly, it may be desired to store, say, American and British templates for words pronounced differently in the two dialects, or for words pronounced by men or women.

Depending on the cost of the store mechanism and the extent to which computational time must be optimized, it may be preferable to set up the template store so that it contains not only word spellings and a feature template or two for each such spelling, but also the numeric digits associated with the spelling. The entries for BAT and CAT, for example, would each include the information that the digit equivalent is 228. The entries would then preferably be ordered numerically rather than the more usual alphabetical ordering.

In the general case of speech recognition the precise length of the word (in letters) is often not known. With the exemplary apparatus, on the other hand, the digit entries indicate the length of the word. Thus, the template store is preferably arranged to permit quick reference to the subset of entries having the correct number of letters.

When the candidate templates are compared and correlation coefficients are derived, the CPU 10 then compares the coefficients. The usual outcome is that one template correlates more highly than any of the others by at least some predetermined margin, and the word indicated thereby is communicated by channel 22 to other equipment, not shown in FIG. 1.

There is the possibility that the template correlating most highly will nonetheless be incorrect, due to any of a number of factors including line noise or too-high or too-faint user speech volume. Depending on the particular application for which the apparatus is used, it may be desirable to confirm each word, or at least words for which the correlation coefficient was low, with the user. The word is synthesized by synthesizer 12, typically using the features of the template of the word from template store 21, and replayed to the user via channel 14. The user will be asked to indicate whether the word has been correctly recognized. Such user indication may be a key press (e.g. 9 for "yes" and 6 for "no", or 1 for "yes" and 2 for "no") or a spoken and recognized "yes" or "no", for example. Such confirmation takes time, of course, so may be omitted in some applications or performed only if the correlation of the word was low or if it bettered the next-best word by only a small margin.

It will be appreciated by those skilled in the art that the hardware of FIG. 1 can be used as a general-purpose apparatus for permitting human users to accomplish any of a wide variety of audiotext input and output functions, requiring only appropriate programming of CPU 10 to permit use of the apparatus for order entry, bank customer inquiry, provision of common carrier schedule or fare information, as well as general-purpose messaging. Such apparatus could also be used for product inquiry, for directory assistance or other data base access, for automated surveying and data-gathering, and could serve as a data entry method for communication with others using telecommunications devices for the deaf. In any of these many applications the audio-augmented data keying of the invention can permit greatly enhanced and versatile user inputs.

Figure 2:
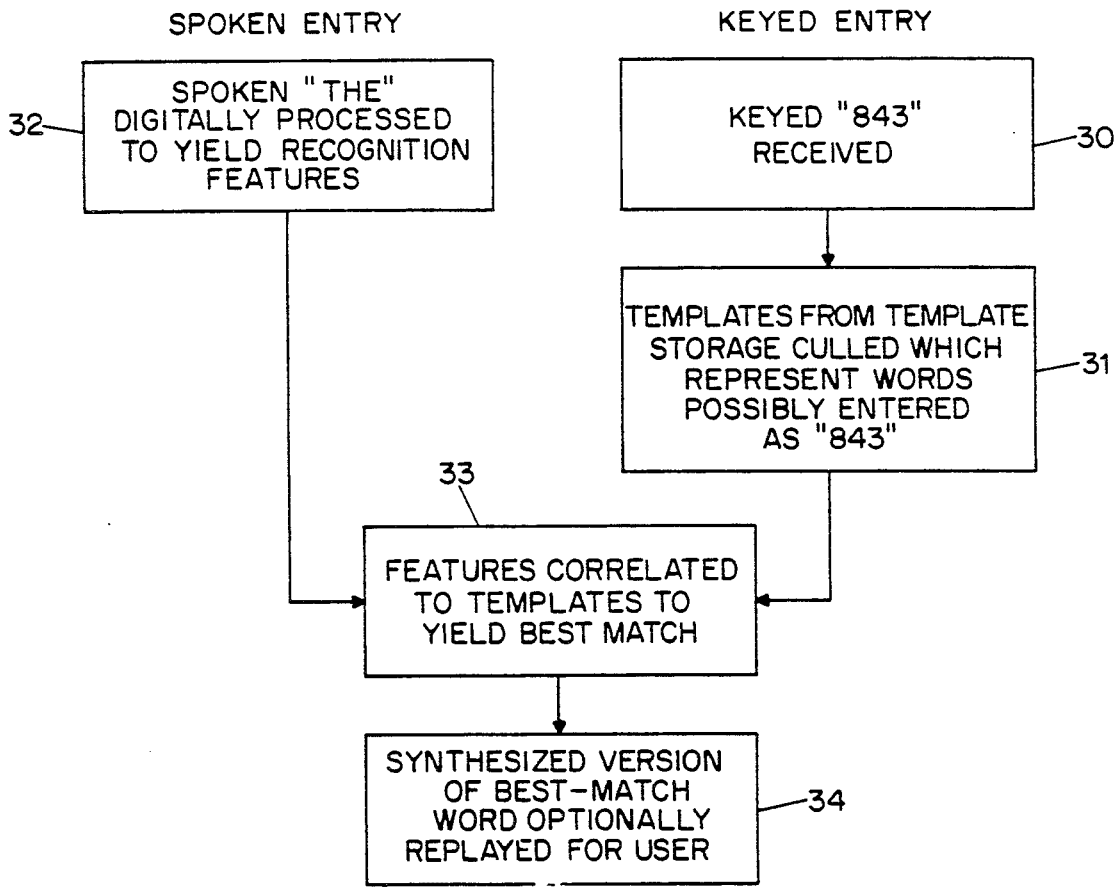
FIG. 2 shows in dataflow form the handling of information by the apparatus of the invention.

FIG. 2 shows in dataflow form the audio-augmented data keying of FIG. 1. Box 30 shows the reception of the touch-tone digits from the user, in this case the digits 8, 4, and 3. Box 31 shows the culling of templates (from the template store) which represent words which the user might have been entering. Note that the word "the" may be pronounced with either of two soundings for the vowel, phonetically "thuh" and "thee". Feature templates for both pronunciations will have been stored in the template store, and both will be culled for possible match with the features of the received audio information from the user.

Box 32 shows the information flow along the audio path through the digital signal processor. Features are extracted from the received word for the recognition process to follow. Box 33 indicates the correlation (comparison) process. The extracted features are compared with each of the candidate feature templates, and the results of the comparisons are stored to the extent necessary to determine which feature template yields the closest match. Optionally, the feature template of the best-match word is used in speech synthesis to produce a replay version of the word to the user, as shown in box 34.

It will be appreciated that it is not strictly necessary first to store the correlation coefficients for each of the candidate templates, and only later to determine which candidate template had the highest coefficient (and thus the best match). Instead, one approach is to establish and maintain only two coefficients, each initialized to zero. One is the "best" coefficient found thus far in the comparison process, and the other is the "second best" coefficient found thus far. Only if a particular comparison yields a coefficient better than either the "best" or "second best" found thus far will it be necessary to update one or the other, or both.

One skilled in the art will appreciate that nothing in the above-described embodiment requires that keying precede speaking. From FIG. 2, for example, it is clear that the comparing step must follow the two data-gathering steps of capturing the spoken audio information and collecting the DTMF digits; nothing requires that either data-gathering step precede the other.

In a second embodiment of the invention, no template store is used. The received DTMF digits are expanded into the range of possible letter combinations, and known pronunciation-by-rule algorithms are used first to eliminate from further consideration the letter combinations that cannot be pronounced (and thus need not be compared with the word spoken by the user), and second to generate the feature template associated with each pronounceable letter combination. The feature templates that result are compared with the features extracted from the spoken and digitally processed word to find the template with the highest correlation coefficient, and processing continues as described for the first embodiment above. In an embodiment handling not only single words but also phrases keyed by the user with an indication (such as the above-mentioned # key) of spaces between words, the feature templates would be generated for the individual words entered and would be pieced together into "phrase templates" for comparison with the spoken phrase. In an embodiment handling not only single words but also phrases keyed by the user with no indication of spaces between words, the feature templates would be generated for the entire sequence that was entered, and would be compared with the spoken phrase.

For allophones, the pronunciation-by-rule algorithm may generate two or more feature templates, each of which may be compared with the extracted features. The algorithm may also generate two or more feature templates to cover, say, common female and male voicing, or British and American accented pronunciations.

A hybrid embodiment is also possible, in which letter combinations derived from the received DTMF digits are used as entry points into a template store, and if a given letter combination is found in the template store then the feature template(s) in the store are used. If, on the other hand, the letter combination does not match any entry in the template store, then the above-mentioned pronunciation-by-rule algorithm is employed to either (1) eliminate the combination from further consideration or (2) yield one or more feature templates for use in the comparison.

I claim:

1. A data-keying apparatus for keying data comprising groups of alphabetic characters corresponding to spoken speech portions, comprising:
   keypad-data receiving means for receiving a group of numeric keying signals, at least some of said numeric keying signals each corresponding to multiple alphabetic characters;
   sound receiving means for detecting sounds corresponding to a spoken speech portion and for extracting features from said sounds;
   template store means for storing a multiplicity of speech portion templates, each template indicative of features associated with sounds corresponding to a speech portion and indicative of the spelling thereof;
   culling means responsive to said group of numeric keying signals for culling from the speech portion templates in said template store means a subset of speech portion templates such that each speech portion template in the subset has a spelling corresponding to said group of numeric keying signals;
   and correlating means responsive to the extracted features for evaluating the correlation between the extracted features and the features of each speech portion template in the subset of speech portion templates, and for identifying the speech portion template in the subset of speech portion templates having the highest correlation with the extracted features.

2. The data-keying apparatus of claim 1, further comprising a speech synthesizer responsive to the correlating means for synthesizing the speech portion corresponding to the speech portion template in the subset of speech portion templates having the highest correlation with the extracted features.

3. The data-keying apparatus of claim 1, further comprising a speech synthesizer responsive to the correlating means for synthesizing a spelling of the speech portion corresponding to the speech portion template in the subset of speech portion templates having the highest correlation with the extracted features.

4. The data-keying apparatus of claim 1 wherein the keypad-data receiving means is a dual-tone multifrequency receiver.

5. The data-keying apparatus of claim 4 wherein the correspondence between numeric keying signals and alphabetic characters is that of a touch-tone telephone keypad.

6. For use with a template store means for storing a multiplicity of speech portion templates, each template indicative of features associated with sounds corresponding to a speech portion and indicative of the spelling thereof, a method for keying data comprising groups of alphabetic characters corresponding to spoken speech portions, comprising the steps of:
   receiving via a keypad a group of numeric keying signals, at least some of said numeric keying signals each corresponding to multiple alphabetic characters;
   detecting sounds corresponding to a spoken speech portion and extracting features from said sounds;
   culling from the speech portion templates in said template store means a subset of speech portion templates such that each speech portion template in the subset has a spelling corresponding to said group of numeric keying signals;
   and evaluating the correlation between the extracted features and the features of each speech portion template in the subset of speech portion templates, and identifying the speech portion template in the subset of speech portion templates having the highest correlation with the extracted features.

7. The data-keying method of claim 6, further comprising the step of synthesizing the speech portion corresponding to the speech portion template in the subset of speech portion templates having the highest correlation with the extracted features.

8. The data-keying method of claim 6, further comprising the step of synthesizing a spelling of the speech portion corresponding to the speech portion template in the subset of speech portion templates having the highest correlation with the extracted features.

9. The data-keying method of claim 6 wherein the received keypad data is dual-tone multifrequency data.

10. The data-keying method of claim 9 wherein the correspondence between numeric keying signals and alphabetic characters is that of a touch-tone telephone keypad.

11. A data-keying apparatus for keying data comprising groups of alphabetic characters corresponding to spoken speech portions, comprising:

keypad-data receiving means for receiving a group of numeric keying signals, at least some of said numeric keying signals each corresponding to multiple alphabetic characters;

sound receiving means for detecting sounds corresponding to a spoken speech portion and for extracting features from said sounds;

template generation means for generation of a multiplicity of speech portion templates, each template indicative of a spelling corresponding to said group of numeric keying signals;

and correlating means responsive to the extracted features for evaluating the correlation between the extracted features and the features of each generated speech portion template, and for identifying the generated speech portion template in the multiplicity of speech portion templates having the highest correlation with the extracted features.

12. The data-keying apparatus of claim 11, further comprising a speech synthesizer responsive to the correlating means for synthesizing the speech portion corresponding to the speech portion template in the multiplicity of speech portion templates having the highest correlation with the extracted features.

13. The data-keying apparatus of claim 11, further comprising a speech synthesizer responsive to the correlating means for synthesizing a spelling of the speech portion corresponding to the speech portion template in the multiplicity of speech portion templates having the highest correlation with the extracted features.

14. The data-keying apparatus of claim 11 wherein the keypad-data receiving means is a dual-tone multifrequency receiver.

15. The data-keying apparatus of claim 14 wherein the correspondence between numeric keying signals and alphabetic characters is that of a touch-tone telephone keypad.

16. A method for keying data comprising groups of alphabetic characters corresponding to spoken speech portions, comprising the steps of:

receiving via a keypad a group of numeric keying signals, at least some of said numeric keying signals each corresponding to multiple alphabetic characters;

detecting sounds corresponding to a spoken speech portion and extracting features from said sounds;

generating from the multiple alphabetic characters a multiplicity of speech portion templates;

and evaluating the correlation between the extracted features and the features of each speech portion template in the multiplicity of speech portion templates, and identifying the speech portion template in the multiplicity of speech portion templates having the highest correlation with the extracted features.

17. The data-keying method of claim 16, further comprising the step of synthesizing the speech portion corresponding to the speech portion template in the multiplicity of speech portion templates having the highest correlation with the extracted features.

18. The data-keying method of claim 16, further comprising the step of synthesizing a spelling of the speech portion corresponding to the speech portion template in the multiplicity of speech portion templates having the highest correlation with the extracted features.

19. The data-keying method of claim 16 wherein the received keypad data is dual-tone multifrequency data.

20. The data-keying method of claim 19 wherein the correspondence between numeric keying signals and alphabetic characters is that of a touch-tone telephone keypad.

* * * * *